(12) United States Patent
Björklund et al.

(10) Patent No.: US 10,318,041 B2
(45) Date of Patent: Jun. 11, 2019

(54) OBJECT DETECTION IN TOUCH SYSTEMS

(71) Applicant: FlatFrog Laboratories AB, Lund (SE)

(72) Inventors: Andreas Björklund, Lund (SE); Tomas Christiansson, Torna-Hallestad (SE); Mats Petter Wallander, Lund (SE); Nicklas Ohlsson, Bunkeflostrand (SE)

(73) Assignee: FlatFrog Laboratories AB, Lund (SE)

( * ) Notice: Subject to any disclaimer, the term of this patent is extended or adjusted under 35 U.S.C. 154(b) by 169 days.

(21) Appl. No.: 14/398,243

(22) PCT Filed: Apr. 29, 2013

(86) PCT No.: PCT/SE2013/050473
§ 371 (c)(1),
(2) Date: Oct. 31, 2014

(87) PCT Pub. No.: WO2013/165305
PCT Pub. Date: Nov. 7, 2013

(65) Prior Publication Data
US 2015/0130769 A1 May 14, 2015

Related U.S. Application Data

(60) Provisional application No. 61/641,520, filed on May 2, 2012.

(30) Foreign Application Priority Data

May 2, 2012 (SE) ...................... 1250433

(51) Int. Cl.
*G06F 3/041* (2006.01)
*G06F 3/042* (2006.01)

(52) U.S. Cl.
CPC .......... *G06F 3/0416* (2013.01); *G06F 3/0421* (2013.01); *G06F 2203/04104* (2013.01); *G06F 2203/04109* (2013.01)

(58) Field of Classification Search
CPC .... G06F 1/3262; G06F 3/0416; G06F 1/3218; G06F 3/044; G06F 3/04886;
(Continued)

(56) References Cited

U.S. PATENT DOCUMENTS 6,972,753 B1 12/2005 Kimura et al.
7,432,893 B2 10/2008 Ma et al.
(Continued)

FOREIGN PATENT DOCUMENTS

WO WO-2009/048365 A1 4/2009
WO WO-2009/077962 A2 6/2009
(Continued)

OTHER PUBLICATIONS

Natterer, Frank. "The Mathematics of Computerized Tomography." Classics in Applied Mathematics; 32, 2001. Chapter 5 "Reconstruction Algorithms" (pp. 102-157) and entire book (pp. 1-222).
(Continued)

*Primary Examiner* — Nitin Patel
(74) *Attorney, Agent, or Firm* — Knobbe Martens Olson & Bear, LLP

(57) ABSTRACT

A signal processor implements a technique for detecting objects on a panel which transmits signals inside the panel such that the objects are allowed to interact with (e.g. attenuate) the signals by contact with a touch surface of the panel. The signal processor operates to define cells that have a given location on the touch surface and are associated with a respective set of intersecting paths for the signals across the touch surface. The signal processor operates to obtain (90) an output signal from a signal detection arrangement that measures a signal property for each path; process (91) the output signal to obtain an interaction value for each path; and generate (93-95') a cell value of a selected cell among the cells as either a robust measure of central tendency (e.g.

(Continued)

a median) or a minimum/maximum among the interaction values for the intersecting paths. The signal processor determines (97) presence or absence of an object in the selected cell based on the cell value.

16 Claims, 9 Drawing Sheets

(58) Field of Classification Search
CPC ......... G06F 1/3265; G06F 2203/04803; G06F 2203/04109; G06F 3/0421; G06F 3/0412; G06F 3/0423; G06F 3/0425; G06F 3/0426; G06F 3/0428; G06F 3/043; G06F 3/0433; G06F 3/0436; G06F 3/042; G06F 2203/04106; G06F 2203/04104; Y02B 60/148; Y02B 60/32; Y02B 60/1242
See application file for complete search history.

(56) References Cited

U.S. PATENT DOCUMENTS

| | | |
|---|---|---|
| 2004/0252091 A1 | 12/2004 | Ma et al. |
| 2006/0114237 A1 | 6/2006 | Crockett et al. |
| 2006/0170658 A1 | 8/2006 | Nakamura et al. |
| 2007/0075648 A1 | 4/2007 | Blythe et al. |
| 2009/0153519 A1* | 6/2009 | Suarez Rovere ..... G06F 3/0421 345/173 |
| 2011/0227874 A1* | 9/2011 | Fahraeus ............... G06F 3/0421 345/175 |
| 2012/0200538 A1 | 8/2012 | Christiansson et al. |
| 2012/0212441 A1 | 8/2012 | Christiansson et al. |
| 2012/0218229 A1* | 8/2012 | Drumm ................ G06F 3/0421 345/175 |
| 2013/0044073 A1 | 2/2013 | Christiansson et al. |
| 2013/0201142 A1 | 8/2013 | Suarez Rovere |
| 2013/0222346 A1* | 8/2013 | Chen ..................... G06F 3/0425 345/175 |
| 2013/0205963 A1 | 10/2013 | Christiansson et al. |

FOREIGN PATENT DOCUMENTS

| | | |
|---|---|---|
| WO | WO-2010/006882 A2 | 1/2010 |
| WO | WO-2010/006883 A2 | 1/2010 |
| WO | WO-2010/006884 A2 | 1/2010 |
| WO | WO-2010/006885 A2 | 1/2010 |
| WO | WO-2010/006886 A2 | 1/2010 |
| WO | WO-2010/064983 A2 | 6/2010 |
| WO | WO-2010/134865 A1 | 11/2010 |
| WO | WO-2011/028169 A1 | 3/2011 |
| WO | WO-2011/049511 A1 | 4/2011 |
| WO | WO-2011/049512 A1 | 4/2011 |
| WO | WO-2011/049513 A1 | 4/2011 |
| WO | WO-2011/139213 A1 | 11/2011 |
| WO | WO-2012/050510 A1 | 4/2012 |
| WO | WO-2012/082055 A1 | 6/2012 |
| WO | WO-2012/121652 A1 | 9/2012 |
| WO | WO-2013/048312 A2 | 4/2013 |
| WO | WO-2013/055282 A2 | 4/2013 |
| WO | WO-2013/062471 A2 | 5/2013 |

OTHER PUBLICATIONS

Kak et al. "Principles of Computerized Tomographic Imaging." The Institute of Electrical Engineers, Inc. (1999).
International Search Report and Written Opinion dated Feb. 3, 2014 in corresponding International Application No. PCT/SE2013/050473.

* cited by examiner

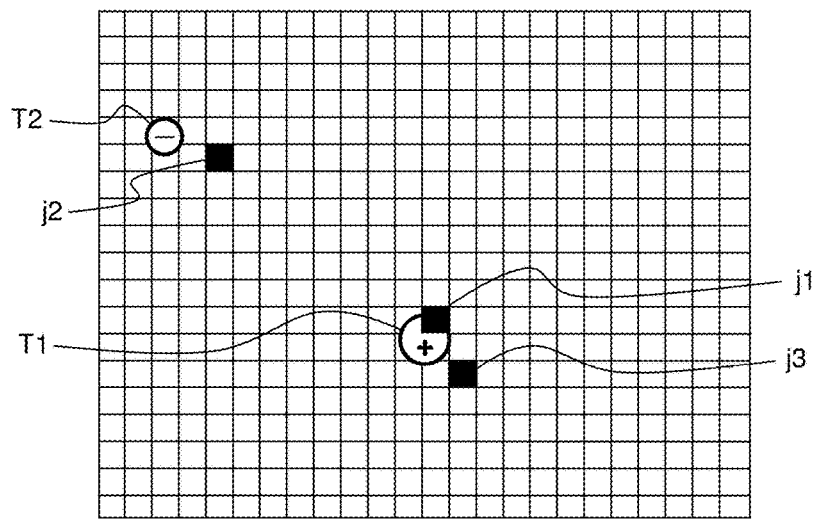
Fig. 3
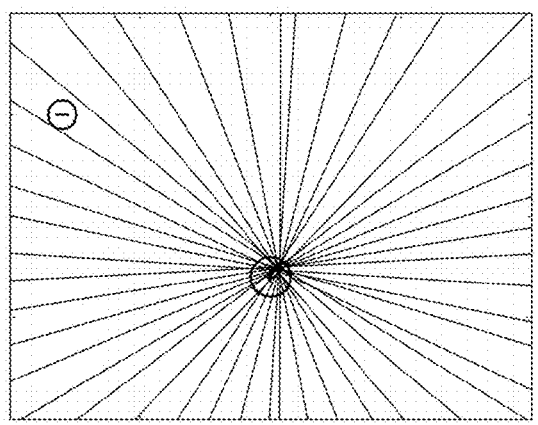
Fig. 4A
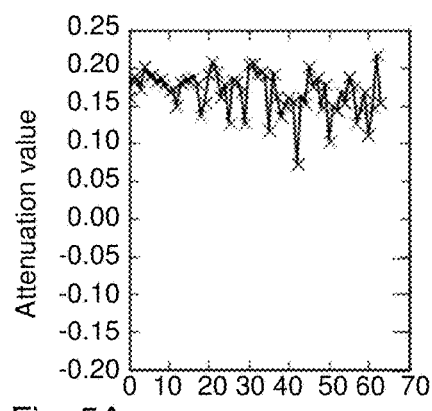
Fig. 5A  Detection line
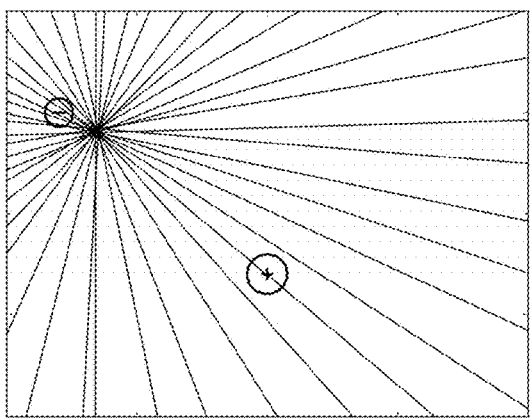
Fig. 4B
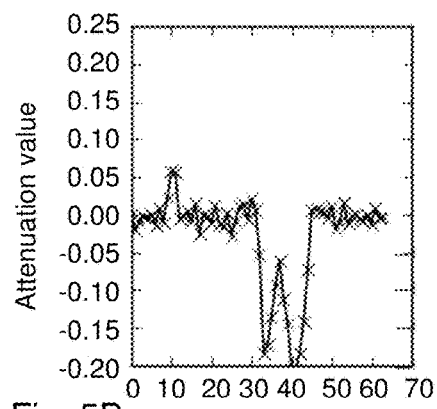
Fig. 5B  Detection line

OBJECT DETECTION IN TOUCH SYSTEMS

CROSS-REFERENCE TO RELATED APPLICATIONS

The present application claims the benefit of Swedish patent application No. 1250433-8, filed 2 May 2012, and U.S. provisional application No. 61/641,520, filed 2 May 2012, both of which are incorporated herein by reference.

TECHNICAL FIELD

The present invention relates to touch systems and data processing techniques in relation to such systems.

BACKGROUND ART

Touch sensing systems ("touch systems") are in widespread use in a variety of applications. Typically, the touch systems are actuated by a touching object such as a finger or stylus, either in direct contact or through proximity (i.e. without contact) with a touch surface. Touch systems are for example used as touch pads of laptop computers, in control panels, and as overlays to displays on e.g. hand held devices, such as mobile telephones. A touch system that is overlaid on or integrated in a display is also denoted a "touch screen". Many other applications are known in the art.

To an increasing extent, touch systems are designed to be able to detect two or more touches simultaneously, this capability often being referred to as "multi-touch" in the art. There are numerous known techniques for providing multi-touch sensitivity, e.g. by using cameras to capture light scattered off the point(s) of touch on a panel, or by incorporating resistive wire grids, capacitive sensors, strain gauges, etc into a panel.

US2004/0252091 discloses an alternative technique which is based on frustrated total internal reflection (FTIR). Diverging light sheets are coupled into a panel to propagate inside the panel by total internal reflection. When an object comes into contact with a surface of the panel, two or more light sheets will be locally attenuated at the point of touch. Arrays of light sensors are located around the perimeter of the panel to detect the received light for each light sheet. A coarse reconstruction of the light field across the panel surface is then created by geometrically back-tracing and triangulating all attenuations observed in the received light. This is stated to result in data regarding the position and size of each contact area.

US2009/0153519 discloses a panel capable of conducting signals on a plurality of signal paths. A "tomograph" is positioned adjacent the panel with signal flow ports arrayed around the border of the panel at discrete locations. Signal values measured at the signal flow ports for the different signal paths are arranged in a sinogram (b) and tomographically processed to generate a representation (x) of the conductivity on the panel in a grid of pixels, whereby touching objects on the panel surface can be detected. The presented technique for tomographic reconstruction is based on a linear model of the tomographic system, $Ax=b$. The system matrix A is calculated at factory, and its pseudo inverse $A^{-1}$ is calculated using Truncated SVD algorithms and operated on the sinogram b of measured signal values to yield the conductivity for the grid of pixels: $x=A^{-1}b$. Thereby, the conductivity of each pixel is given by a linear combination of the measured signal values. US2009/0153519 also mentions that the signal values of certain signal paths may be discarded or not measured at all, e.g. signal values for signal paths that are too short or known to produce weak signals.

The technique presented in US2009/0153519 is merely a straight-forward implementation of well-known tomographic algorithms for reconstructing an image of a cross-section through an attenuating medium based on projection measurements through the attenuating medium. Many tomographic algorithms are known in the art, e.g. Filtered Back Projection (FBP), FFT-based algorithms, ART (Algebraic Reconstruction Technique), SART (Simultaneous Algebraic Reconstruction Technique), etc. On a general level, the tomographic algorithms apply a back projection or inversion function on the projection measurements to produce reconstruction values that represent the attenuating medium. The inversion function may operate in either the spatial domain or the Fourier domain to provide a solution to a linear system of equations. Generally, in all of the above-mentioned tomographic algorithms, the inversion function is designed to generate the reconstruction value of a pixel in the image as a linear combination of the projection measurements through this pixel, as well as at least part of the projection measurements through other pixels. For further details, reference is made to "The Mathematics of Computerized Tomography", by F Natterer, 2001, Chapter V: "Reconstruction algorithms".

Conventionally, tomographic algorithms are designed for medical imaging purposes and operate on a large number of projection measurements at specific angles to the attenuating medium, where the projection measurements are produced by a rotating measurement system. Touch systems, on the other hand, have a fixed measurement system (cf. the above-mentioned signal ports) which produces a limited number of projection measurements at signal paths that are generally mismatched to the tomographic algorithms. This may introduce reconstruction errors into the resulting image and make it difficult to properly detect touching objects. Reconstruction errors may e.g. make it difficult to detect weakly interacting objects in presence of strongly interacting objects, or to separately detect objects in proximity to each other on the touch surface.

In addition, touch systems typically need to operate to generate the image in real time and at high repetition rate, e.g. 10-100 Hz.

There is thus a general need to develop improved techniques for detecting objects on a touch surface based on projection measurements through a signal conducting panel.

SUMMARY

It is an objective of the invention to at least partly overcome one or more limitations of the prior art.

Another objective is to provide a technique that enables touch detection irrespective of the arrangement of the projection measurements across the touch surface.

Yet another objective is to provide a touch detection technique that enables touch detection in real time.

One or more of these objectives, as well as further objectives that may appear from the description below, are at least partly achieved by means of methods, computer-readable media, devices and touch-sensitive apparatus according to the independent claims, embodiments thereof being defined by the dependent claims.

The invention is based on the insight that objects generally produce isolated areas of interaction on a touch surface, and that a major part of the touch surface is unaffected by objects. Thereby, a characteristic cell value indicative of the touch status of a selected cell on the touch surface may be given by the interaction values for the transmission paths that intersect the selected cell. As used herein, a transmission path is deemed to intersect a cell when at least portion of the transmission path extends through the cell. The characteristic cell value is extracted so as to be likely to represent one or more intersecting transmission paths that do no intersect any objects at all, if there are any such intersecting transmission paths for the selected cell. Otherwise, the characteristic cell value is extracted so as to be likely to represent one or more intersecting transmission paths that only intersect a single object that covers the selected cell. To achieve this desired property, the characteristic cell value is calculated differently depending on the format of the interaction values, viz. if a presence of interaction on a transmission path may result in both larger and smaller interaction values than an absence of interaction, or only smaller or larger interaction values. Therefore, the inventive concept is claimed as a first and a second inventive technique.

Generally, the inventive techniques allow the touch status to be determined directly from the transmission paths that intersect the individual cells. Thereby, it is possible to dispense with tomographic processing and also eliminate the reconstruction errors that are inherent to such processing. The inventive techniques are thus direct techniques, which do not involve finding a solution to a linear system of equations, and may be implemented as a processing-efficient process on a signal processor. Since the cell value is given directly by the interaction values of the intersecting transmission paths, the inventive techniques do not require a particular layout of the transmission paths across the touch surface. The computation of the characteristic cell value also provides an improved ability of detecting weak touches in the presence of strong touches on the touch surface. It should also be noted that the inventive techniques may be used in combination with advanced image reconstruction processing such as tomography, e.g. to validate cells within regions with reconstruction errors.

A first aspect of the first inventive technique is a method of detecting objects on a panel, which is configured to transmit signals inside the panel such that the objects are allowed to interact with the signals by contact with a touch surface of the panel. The method comprises the steps of: defining a plurality of reconstruction cells with respect to the touch surface, each reconstruction cell having a given location on the touch surface and being intersected by a respective set of transmission paths for the signals across the touch surface; obtaining an output signal from a signal detection arrangement which is configured to measure a signal property for each transmission path; processing the output signal to obtain an interaction value for each transmission path; and generating a cell value for a selected reconstruction cell among the reconstruction cells based on the interaction values for the set of transmission paths that intersect the selected reconstruction cell; wherein the cell value is generated as a function of a subset of the interaction values that are closest to a target value set to indicate absence of interaction.

In one embodiment, the interaction between one of the objects and the signals on the transmission paths is represented by interaction values of a given sign.

In one embodiment, the interaction values are generated to represent interactions between one of the objects and the signals on the transmission paths by one of exclusively non-negative values and exclusively non-positive values.

In one embodiment, the target value is set to zero.

In one embodiment, the cell value is generated by extracting one of a single interaction value, a percentile value, and an average of interaction values within a percentile among the interaction values for the set of transmission paths that intersect the selected reconstruction cell.

A second aspect of the first inventive technique is a computer-readable medium comprising computer code which, when executed on a data-processing system, is adapted to carry out the method of the first aspect of the first inventive technique.

A third aspect of the first inventive technique is a device for detecting objects on a panel, which is configured to transmit signals inside the panel such that the objects are allowed to interact with the signals by contact with a touch surface of the panel. The device comprises: means for defining a plurality of reconstruction cells with respect to the touch surface, each reconstruction cell having a given location on the touch surface and being intersected by a respective set of transmission paths for the signals across the touch surface; means for obtaining an output signal from a signal detection arrangement which is configured to measure a signal property for each transmission path; means for processing the output signal to obtain an interaction value for each transmission path; and means for generating a cell value for a selected reconstruction cell among the reconstruction cells based on the interaction values for the set of transmission paths that intersect the selected reconstruction cell; wherein the means for generating is configured to generate the cell value as a function of a subset of the interaction values that are closest to a target value set to indicate absence of interaction.

A fourth aspect of the first inventive technique is a touch-sensitive apparatus. The apparatus comprises: a panel configured to conduct signals from a plurality of peripheral incoupling points to a plurality of peripheral outcoupling points, thereby defining transmission paths that extend across a touch surface on the panel between pairs of incoupling and outcoupling points; means for generating the signals at the incoupling points; a signal detection arrangement for generating an output signal based on detected signals at the outcoupling points; and the device according to the third aspect of the first inventive technique.

Any one of the above-identified embodiments of the first aspect of the first inventive technique may be adapted and implemented as an embodiment of the second to fourth aspects of the first inventive technique.

A first aspect of the second inventive technique is a method of detecting objects on a panel, which is configured to transmit signals inside the panel such that the objects are allowed to interact with the signals by contact with a touch surface of the panel. The method comprises the steps of: defining a plurality of reconstruction cells with respect to the touch surface, each reconstruction cell having a given location on the touch surface and being intersected by a respective set of transmission paths for the signals across the touch surface; obtaining an output signal from a signal detection arrangement which is configured to measure a signal property for each transmission path; processing the output signal to obtain an interaction value for each transmission path such that the interaction between the objects and the signals on the transmission paths is represented by interaction values that are larger and smaller than a target value that represents absence of interaction; and generating a cell value for a selected reconstruction cell among the reconstruction cells based on the interaction values for the set of transmission paths that intersect the selected reconstruction cell; wherein the cell value is generated as a robust measure of central tendency among at least part of the interaction values for the set of transmission paths.

In one embodiment, the robust measure of central tendency is computed to represent a median value among said at least part of the interaction values.

In one embodiment, the method further comprises steps of: estimating a location of the objects on the touch surface; and selecting, based on the estimated location of the objects and for the selected reconstruction cell, a subset of the set of transmission paths that intersect the selected reconstruction cell, wherein the subset is selected to exclude the transmission paths that geometrically intersect the estimated location of at least one of the objects, and wherein the robust measure of central tendency is computed for the interaction values of the selected subset.

A second aspect of the second inventive technique is a computer-readable medium comprising computer code which, when executed on a data-processing system, is adapted to carry out the method according to the first aspect of the second inventive technique.

A third aspect of the second inventive technique is a device for detecting objects on a panel, which is configured to transmit signals inside the panel such that the objects are allowed to interact with the signals by contact with a touch surface of the panel. The device comprises: means for defining a plurality of reconstruction cells with respect to the touch surface, each reconstruction cell having a given location on the touch surface and being intersected by a respective set of transmission paths for the signals across the touch surface; means for obtaining an output signal from a signal detection arrangement which is configured to measure a signal property for each transmission path; means for processing the output signal to obtain an interaction value for each transmission path such that the interaction between the objects and the signals on the transmission paths is represented by interaction values that are larger and smaller than a target value that represents absence of interaction; and means for generating a cell value for a selected reconstruction cell among the reconstruction cells based on the interaction values for the set of transmission paths that intersect the selected reconstruction cell; wherein said means for generating is configured to generate the cell value as a robust measure of central tendency among at least part of the interaction values for the set of transmission paths.

A fourth aspect of the first inventive technique is a touch-sensitive apparatus. The apparatus comprises: a panel configured to conduct signals from a plurality of peripheral incoupling points to a plurality of peripheral outcoupling points, thereby defining transmission paths that extend across a touch surface on the panel between pairs of incoupling and outcoupling points; means for generating the signals at the incoupling points; a signal detection arrangement for generating an output signal based on detected signals at the outcoupling points; and the device according to the third aspect of the second inventive technique.

Any one of the above-identified embodiments of the first aspect of the second inventive technique may be adapted and implemented as an embodiment of the second to fourth aspects of the second inventive technique.

Below follows a number of embodiments that are applicable to either one of the first and second inventive techniques. Although they are presented as embodiments of the first aspects (methods), the following embodiments may also be adapted and implemented as embodiments of the second to fourth aspects.

In one embodiment, the method further comprises a step of normalizing, before the step of generating the cell value, the interaction values for the set of transmission paths that intersect the selected reconstruction cell, by a respective intersection value which corresponds to a relative overlap between the respective transmission path and the selected reconstruction cell.

In one embodiment, the step of generating the cell value is performed for a plurality of selected reconstruction cells within a region of interest on the touch surface. The method may further comprise a step of generating a two-dimensional distribution of reconstruction values representative of interaction on the touch surface by operating an image reconstruction algorithm on the interaction values for at least part of the transmission paths, and processing the two-dimensional distribution for identification of said region of interest. For example, the region of interest may be identified in the two-dimensional distribution to contain at least one object, or the region of interest may be a coherent region of reconstruction values that all indicate presence of an object.

In one embodiment, the interaction value is generated to represent a change in interaction with respect to a reference value for the transmission path.

In one embodiment, the method comprises a step of determining a touch status for the selected reconstruction cell by comparing the cell value to a threshold, wherein the touch status indicates presence or absence of one of the objects in the selected reconstruction cell.

In one embodiment, the signal detection arrangement is configured to measure energy of light that has propagated along the transmission paths inside the panel by internal reflections between a front surface and an opposing surface of the panel, wherein the front surface defines the touch surface and allows the light to be attenuated by interaction with the objects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIG. 3 is a top plan view of a reconstruction grid defined on a touch surface with two touches.

FIGS. 4A-4C are top plan views that illustrate detection lines that intersect a respective cell in FIG. 3.

FIGS. 5A-5C are plots of attenuation values for the respective set of detection lines in FIGS. 4A-4C.

DETAILED DESCRIPTION OF EXAMPLE EMBODIMENTS

Figure 1:
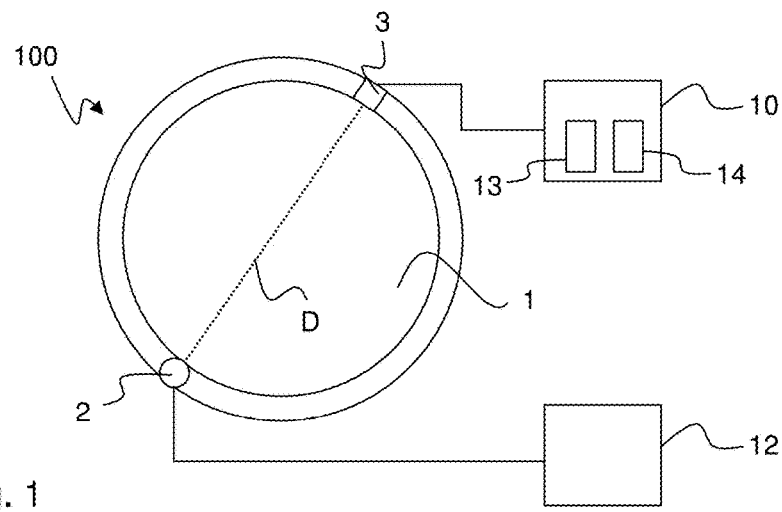
FIG. 1 is a top plan view of a touch-sensitive apparatus.

Below follows a description of example embodiments of a technique for detecting objects in contact with a touch surface of a touch-sensitive apparatus. Throughout the following description, the same reference numerals are used to identify corresponding elements.

1. Touch-Sensitive Apparatus

FIG. 1 illustrates a touch-sensitive apparatus 100 which is based on the concept of transmitting signals of some form inside a panel across a touch surface 1, such that an object that is brought into close vicinity of, or in contact with, the touch surface 1 causes a change in a property of the transmitted signal. The touch-sensitive apparatus 100 includes an arrangement of emitters and sensors, which are distributed along the periphery of the touch surface. Each pair of an emitter and a sensor defines a "detection line", which corresponds to the propagation or transmission path for an emitted signal from the emitter to the sensor. In FIG. 1, only one such detection line D is illustrated to extend from emitter 2 to sensor 3, although it should be understood that the arrangement typically defines a more or less dense grid of detection lines, each corresponding to a signal being emitted by an emitter and detected by a sensor. Any object that touches the touch surface along the extent of the detection line D may thus change the signal property measured by the sensor 3.

The arrangement of sensors (detectors) is electrically connected to a signal processor 10, which samples and processes an output signal from the arrangement. The output signal contains a number of sub-signals, also denoted "projection signals", each representing a property of the signal emitted by a certain emitter 2 and received by a certain detector 3. Depending on implementation, the signal processor 10 may need to process the output signal for separation of the individual projection signals. The output signal may e.g. be indicative of the received energy (or an equivalent parameter, such as power or intensity) at each sensor 3. As will be explained below, the signal processor 10 may be configured to repeatedly process the output signal for detection of objects on the touch surface 1. The signal processor may e.g. extract a position (e.g. x, y coordinates), a shape or an area of each object. In the following, a "frame" denotes a repeated event starting with data collection and ending with detection of touches for the collected data.

The objects on the touch surface 1 may include control objects that engage the touch surface under active and deliberate control by a user for the purpose of producing an action. These control objects generate "touches" on the touch surface 1. The objects on the touch surface 1 may also include unintended objects that end up on the touch surface 1 without any intention of producing an action, but rather constitute an interference to the detection of touches. These unintended objects are collectively referred to as "contaminations" and include fingerprints, grease, spills, smear and other deposits. As will be described below, the projection signals may be processed to suppress or essentially eliminate the influence of contaminations, leaving only touches to be detected on the touch surface 1.

In the example of FIG. 1, the apparatus 100 also includes a controller 12 which is connected to selectively control the activation of the emitters 2 and, possibly, the readout of data from the sensors 3. The signal processor 10 and the controller 12 may be configured as separate units, or they may be incorporated in a single unit. As indicated, the signal processor 10 may include a processing unit 13 that operates in association with an electronic memory 14.

The apparatus 100 may be configured to permit transmission of signals in one of many different forms. The emitted signals may thus be any radiation or wave energy that can travel in and across the touch surface 1 including, without limitation, light waves in the visible or infrared or ultraviolet spectral regions, electrical energy, electromagnetic energy, magnetic energy, sonic energy, ultrasonic energy and vibration energy.

Figure 2A:
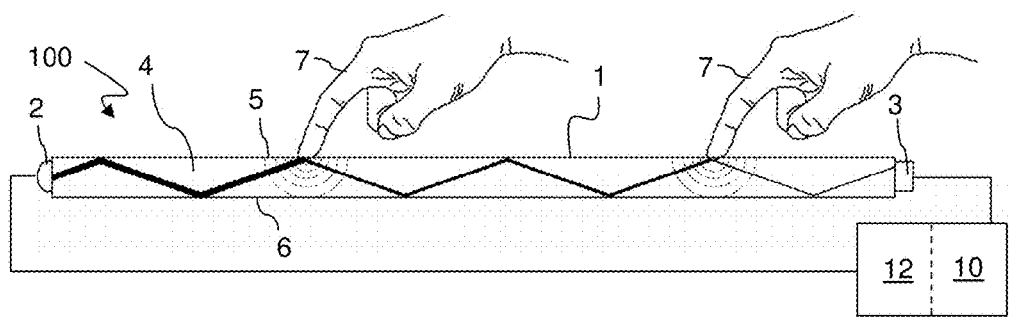
FIGS. 2A-2B are side and top plan views of a touch-sensitive apparatus operating by frustrated total internal reflection (FTIR).
Figure 2B:
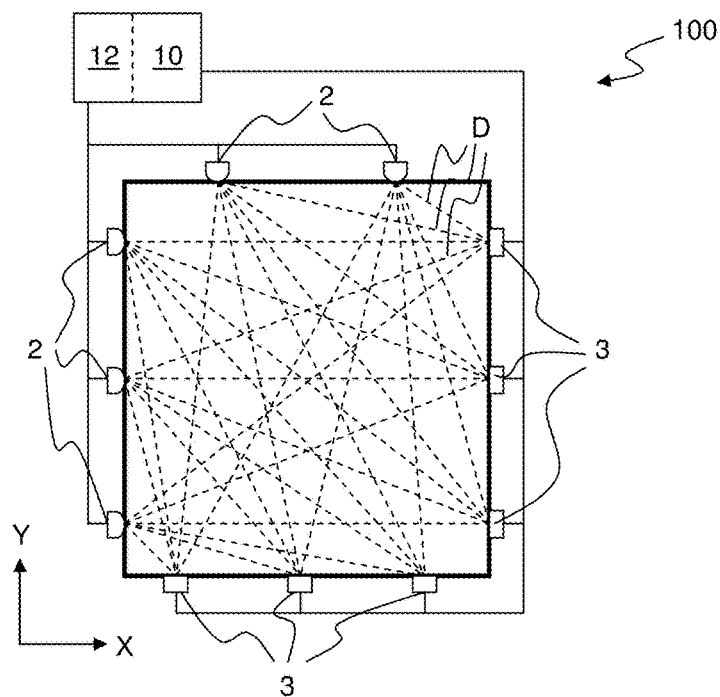

Embodiments of the invention may, e.g., be applied in an apparatus 100 that operates by frustrated total internal reflection (FTIR), as described in the Background section. FIGS. 2A-2B illustrate an example of such an "FTIR system", in which emitters 2 and sensors 3 are placed along the periphery of a light transmissive panel 4, which defines the surface 1. The panel 4 is made of solid material in one or more layers and may have any shape. The panel 4 defines an internal radiation propagation channel, in which light propagates by internal reflections. In the example of FIG. 2A, the propagation channel is defined between the boundary surfaces 5, 6 of the panel 4, where the top surface 5 allows the propagating light to interact with touching objects 7 and thereby defines the touch surface 1. This is achieved by injecting the light into the panel 4 such that the light is reflected by total internal reflection (TIR) in the touch surface 1 as it propagates through the panel 4. The light may be reflected by TIR in the bottom surface 6 or against a reflective coating thereon. It is also conceivable that the propagation channel is spaced from the bottom surface 6, e.g. if the panel comprises multiple layers of different materials.

The apparatus 100 allows an object 7 that is brought in contact with the touch surface 1 to interact with the propagating light at the point of touch. In this interaction, part of the light may be scattered by the object 7, part of the light may be absorbed by the object 7, and part of the light may continue to propagate in its original direction across the panel 1. Thus, the object 7 causes a local frustration of the total internal reflection, which leads to a decrease in the energy/power/intensity of the transmitted light, as indicated by the thinned lines downstream of the objects 7 in FIG. 2A.

Light generated by the emitters 2 is coupled into the panel 1 at a plurality of incoupling points (ports), propagates by TIR inside the panel 4, and is detected by the sensors 3 at plurality of outcoupling points (ports). In the example of FIG. 2B, light is coupled into the panel 1 in the shape of a beam or wave that diverges in the plane of the touch surface 1, and the sensors 3 are arranged to receive light over a wide range of angles (field of view). Thus, light propagation paths are defined between the emitters 2 and the sensors 3. Each of the light propagation paths, as projected onto the touch surface 1, forms a respective detection line D in a grid of detection lines D across the touch surface 1, as shown in FIG. 2B.

FIGS. 2A-2B are merely given as an example of an FTIR system. Further examples of FTIR systems are e.g. disclosed in U.S. Pat. Nos. 6,972,753, 7,432,893, US2006/0114237, US2007/0075648, WO2009/048365, WO2010/006882, WO2010/006883, WO2010/006884, WO2010/006885, WO2010/006886, WO2010/064983, and WO2010/134865, which are all incorporated herein by this reference. The inventive technique is applicable to all types of FTIR systems.

2. Data Formatting

As noted in the foregoing, the signal processor 10 operates in a sequence of frames. In each frame, a projection value representing measured energy/power/intensity is determined for each projection signal, i.e. for each detection line D. In the following examples, it is presumed that the projection values are converted into an "attenuation value" for each detection line. The attenuation value for the k:th detection line $D_k$ is given by: $\overline{\alpha_k} = -\log(I_k/\text{REF}_k)$, or equivalently $\overline{\alpha_k} = \log(\text{REF}_k) - \log(I_k)$, where $I_k$ is the projection value for detection line $D_k$, and $\text{REF}_k$ is a reference value for detection line $D_k$. This format may be understood by considering that the transmission along a detection line $D_k$ may be represented as: $T_k = I_k/\text{REF}_k = e^{-\int a(x,y)dl}$, where $a(x,y)$ is the distribution of attenuation on the touch surface. Thereby, $\overline{\alpha_k}$ represents an aggregation of the attenuation along the detection line: $\overline{\alpha_k} = -\log(T_k) = \int a(x,y)dl$. It is understood that a "logarithm" is intended to also encompass functions approximating a true logarithmic function, in any base.

As will be explained below, the attenuation value may be seen to represent a change in attenuation on the detection line on a time scale given by the reference value $\text{REF}_k$.

In a first embodiment, further discussed in WO2010/064983, WO2011/049512, and WO2012/121652, the reference values are given by the projection signals at a certain calibration time point when no touching object (finger, stylus, etc) is present on the touch surface, such as when the assembly of the apparatus 100 is finalized, at start-up, or when a user initiates a reset operation of the apparatus 100. These reference values may be stored in memory 14. In this embodiment, the attenuation values are non-negative and represent the total accumulated attenuation on the individual detection lines since the calibration time point. To the extent that contaminations on the touch surface cause a detectable attenuation, the reference values may be intermittently updated to include the influence of such contaminations, e.g. as suggested in WO2010/064983 or WO2012/121652. Thereby, the attenuation values mainly represent the total accumulated attenuation caused by touches on the touch surface, and an attenuation value close to zero corresponds to an absence of touches on the detection line. The format of attenuation values generated by the first embodiment is generally referred to as "accumulated format" herein. For attenuation values in the accumulated format, a touch is represented as a positive attenuation change in one or more reconstruction cells.

In a second embodiment, disclosed in WO2013/048312 and WO2013/055282, the reference values are repeatedly set equal to the projection values at a given time interval $\Delta t$. The attenuation values at time t are thus given by: $\overline{\alpha_t} = -\log(I_t/I_{t-\Delta t}) = \log(I_{t-\Delta t}) - \log(I_t)$, wherein $I_t$ are the projection values at time t and $I_{t-\Delta t}$ the projection values at time $t-\Delta t$. Thereby, the attenuation values represent the change in attenuation on each detection line during $\Delta t$. The time interval $\Delta t$ may be set depending on implementation and may range from 1 frame to several frames. It is understood that the attenuation values extend from negative values to positive values, where negative attenuation values indicate a decrease in attenuation, e.g. caused by removal of an object during $\Delta t$, and positive attenuation values indicate an increase in attenuation, e.g. caused by addition of an object during $\Delta t$. Attenuation values in this format may improve detection of fast moving touches compared to touches that move slowly or not at all on the touch surface, while also reducing the impact of contaminations on the touch surface.

In a variation of the second embodiment, the reference values are updated to factor in projection values from more than one time point. For example, the reference values may be given by a temporally low-pass filtered projection value $\overline{I_{t-m}}$, e.g. $\overline{\alpha_t} = \log(\overline{I_{t-m}}) - \log(I_t)$, where $\overline{I_{t-m}}$ or $\log(\overline{I_{t-m}})$ may be computed using any temporal low-pass filter. One such example is an exponential forget filter, such as: $\overline{I_{t-m}} = \overline{I_{t-m-1}} \mp \varepsilon \cdot (I_{t-m} - \overline{I_{t-m-1}})$, or $\log(\overline{I_{t-m}}) = \log(\overline{I_{t-m-1}}) \mp \varepsilon \cdot (\log(I_{t-m}) - \log(\overline{I_{t-m-1}}))$, where $0 < \varepsilon \leq 1$. It is also possible to compute $\overline{I_{t-m}}$ or $\log(\overline{I_{t-m}})$ using a moving average, etc. In all of these examples, m denotes frames and may have any suitable number, including 0.

The format of attenuation values generated by the second embodiment is generally referred to as "differential format" herein. It is to be noted that a moving control object will be represented by both positive and negative attenuation values in the differential format. Thus, for attenuation values in the differential format, a touch may be represented as either a positive or a negative attenuation change in one or more reconstruction cells.

3. Data Processing

In embodiments of the invention, the attenuation values are processed for detection of touches in a grid of reconstruction cells, which are mapped to the touch surface. An example of a grid of reconstruction cells is shown in FIG. 3. The cells may have any shape, size and distribution on the touch surface, but each cell is defined to have a known location and extent on the touch surface.

The inventive touch detection technique is based on the insight that touches generally appear as isolated areas of changed attenuation on the touch surface, and that a major part of the touch surface is unaffected by touches. As will be explained in the following, with reference to three cells j1-j3 in FIG. 3, it is possible to assess if a selected cell contains a touch by evaluating a characteristic cell value which is computed based on the attenuation values for the detection lines that intersect the selected cell. The following examples are given for attenuation values in the differential format, where the attenuation values are representative of a positive touch T1 and a negative touch T2 on the touch surface during the time interval $\Delta t$, as indicated in FIG. 3.

FIG. 4A illustrates detection lines that intersect the cell j1, which contains the positive touch T1, and FIG. 5A is a plot of the attenuation values of the intersecting detection lines. In FIG. 5A, the attenuation values are ordered according to the angular succession of detection lines in FIG. 4A. As seen, all detection lines have a positive attenuation value.

FIG. 4B illustrates detection lines that intersect the cell j2, which is located near but separate from the negative touch T2, and FIG. 5B is a plot of angularly ordered attenuation values for the intersecting detection lines in FIG. 4B. As seen, a majority of the detection lines have an attenuation value close to zero, while a small set of detection lines that intersect the positive touch T1 have positive attenuation values and a larger set of detection lines that intersect the negative touch T2 have a negative attenuation values.

Figure 4C:
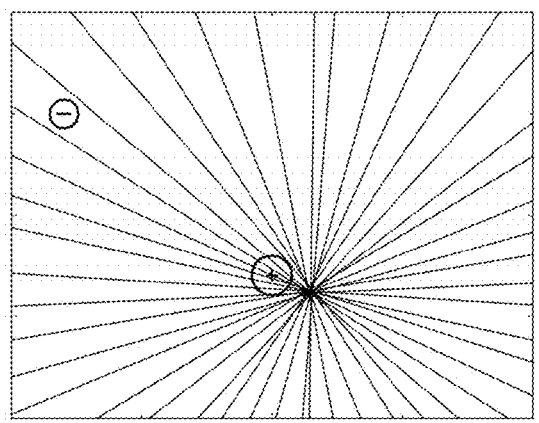
Figure 5C:
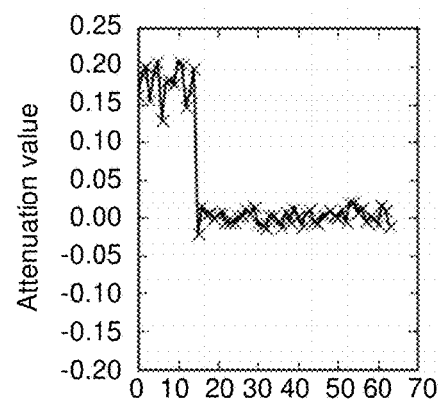

FIG. 4C illustrates detection lines that intersect the cell j3, which is located near but separate from the positive touch T1, and FIG. 5C is a plot of angularly ordered attenuation values for the intersecting detection lines in FIG. 4C. As seen, a majority of the detection lines have an attenuation value close to zero, while a relatively large set of detection lines that intersect the positive touch T1 have positive attenuation values.

Figure 6A:
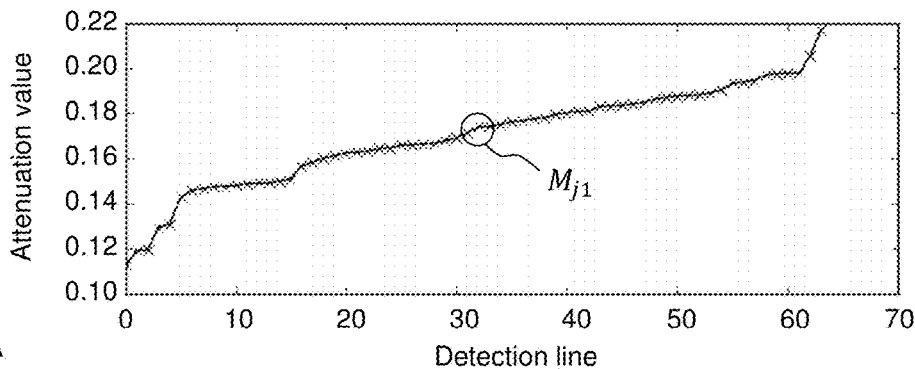
FIGS. 6A-6C are plots of the attenuation values in FIGS. 5A-5C sorted by magnitude.
Figure 6B:
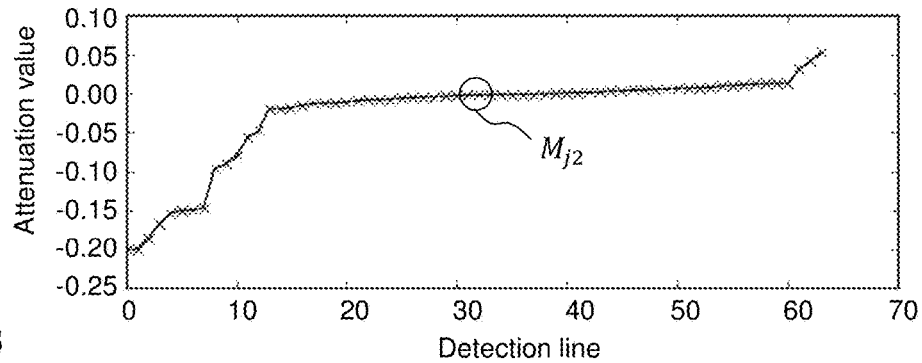
Figure 6C:
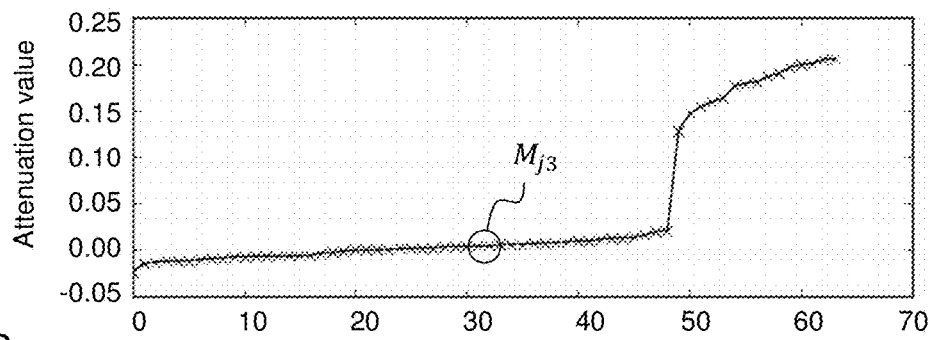

FIGS. 5A-5C indicate that the distribution of attenuation values for the detection lines that intersect a given cell contains information about the presence or absence of a touch in the cell. The differences in distribution between different cells j1-j3 are further illustrated in FIGS. 6A-6C which are plots of the attenuation values in FIGS. 5A-5C, respectively, sorted by magnitude.

According to embodiments of the invention, the presence or absence of a touch in a given cell is determined based on a characteristic cell value. The characteristic cell value is extracted so as to be likely to represent one or more intersecting detection lines that do no intersect any objects at all, if there are any such intersecting detection lines for the given cell. Otherwise, the characteristic cell value is extracted so as to be likely to represent one or more intersecting detection lines that only intersect a single object that covers the given cell. To achieve this desired property of the characteristic cell value, the attenuation values need to be processed differently depending on their format.

It should be emphasized, though, that the characteristic cell value need not be a correct estimate of the attenuation within the respective cell, but is primarily computed to enable detection of absence of presence of a touch in the cell.

It should also be emphasized that even if the detection lines D are illustrated as thin lines in all drawings herein, they may actually be bands with a finite width in the plane of the touch surface 1.

3.1 Attenuation Values in Accumulated Format

If the attenuation values are given in the accumulated format, all touches on the touch surface are represented by positive attenuation values. Thus, the detection lines that are unaffected by touches will have a minimum attenuation value, whereas the detection lines that are affected by touches will have an attenuation value which increases with the number of touches. If the influence of contaminations is insignificant or actively suppressed, the minimum attenuation value will be close to zero. It is realized that the desired property of the characteristic cell value may be obtained by selecting the characteristic cell value to represent the minimum among the attenuation values of the intersecting detection lines.

Figure 7:
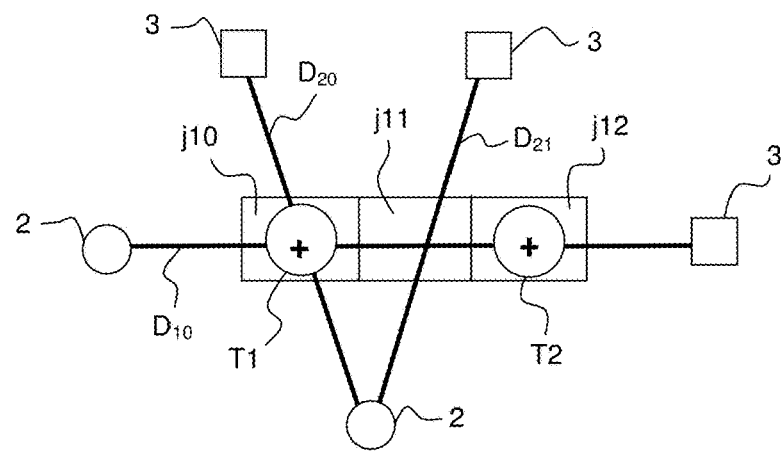
FIGS. 7-8 are simplified examples of reconstruction cells, touches and detection lines to describe inventive touch detection techniques using attenuation values in accumulated format and differential format, respectively.

This computation of the characteristic cell value will be further motivated with reference to FIG. 7, which is a simplified example of three cells j10, j11, j12, a strong touch T1 (attenuation $\alpha$), a weak touch T2 (attenuation $0.1\alpha$) and three detection lines $D_{10}$, $D_{20}$, $D_{21}$. It is thus expected that detection lines $D_{10}$, $D_{20}$, $D_{21}$ present an approximate attenuation of $1.1\alpha$, $\alpha$ and 0, respectively. The minimum attenuation value among the intersecting detection lines for each of cells j10 and j11 is $\alpha$ and 0, respectively. Clearly, the extraction of minimum values correctly indicates whether a touch is present in these cells. This could be compared to the approach of using a back projection function for estimating the cell values. The back projection function generates each cell value as the mean of the attenuation values for the intersecting detection lines, which yields the cell values of $1.05\alpha$ and $0.55\alpha$ for cells j10 and j11, respectively. These cell values will make touch detection more difficult.

The skilled person readily understands that the use of a minimum will generally produce a characteristic cell value that indicates if a cell contains a touch or not, also with a more realistic arrangement of detection lines such as shown in FIGS. 4A-4C. Even if FIGS. 4A-4C represent touches in differential format, FIG. 4A and FIG. 4C may nevertheless be used to exemplify the use of a minimum as characteristic cell value (since the detection lines in these Figures do not intersect the negative touch). As shown in FIG. 5A, when the cell contains a touch (FIG. 4A) all (or nearly all) of the intersecting detection lines will be attenuated. Clearly, the smallest attenuation is a good estimate of the attenuation within the cell. As shown in FIG. 5C, when there is no touch in the cell (FIG. 4C), at least some of intersecting detection lines will no longer be attenuated, and the smallest attenuation is also a good estimate of the attenuation within the cell.

The characteristic cell value may be estimated by other measures that produce a result equivalent of a minimum, e.g. a percentile value among the attenuation values for the intersecting detection lines. A percentile value is the attenuation value below which a certain percentage of the attenuation values fall. For example, the characteristic cell value may be estimated by percentile value of 10 or less, and preferably a percentile value of 5 or less. As an alternative, the characteristic cell value may be computed as the mean of the attenuation values within such a percentile, or the mean of a given number of the smallest attenuation values.

3.2 Attenuation Values in Differential Format

If the attenuation values are given in the differential format, it is quite possible that touches represented by positive attenuation values ("positive touches") co-exist with touches represented by negative attenuation values ("negative touches") on the touch surface. Thus, the detection lines that are unaffected by touches will have (near) zero attenuation, whereas the detection lines that are affected by touches will have either a positive attenuation value or a negative attenuation value (and they may exceptionally have zero attenuation if they are equally affected by both positive and negative touches). As will be explained, the desired property of the characteristic cell value may be obtained by computing a robust measure of central tendency among the attenuation values of the intersecting detection lines. A "robust measure of central tendency" is a well-known term within the concept of robust statistics. In contrast to a mean, which is a measure of central tendency of a data set, a robust measure of central tendency has a resistance to outliers in the data set, i.e. a significant deviation in one or more data values in the data set. The resistance to outliers is also known as the "breakdown point" in the art. A commonly used robust measure of central tendency is the median, which is the middle value of a sorted data set. Another is the truncated mean or trimmed mean, which is a mean computed after discarding given parts or proportions of a sorted data set at the high and low ends, and typically discarding an equal amount of both. Thus, the trimmed mean may be equivalent to computing the mean of the data values around the median. For example, the trimmed mean may be given by the data values in the range between the 25th and 75th percentiles, or between any other percentiles in this range.

Figure 8:
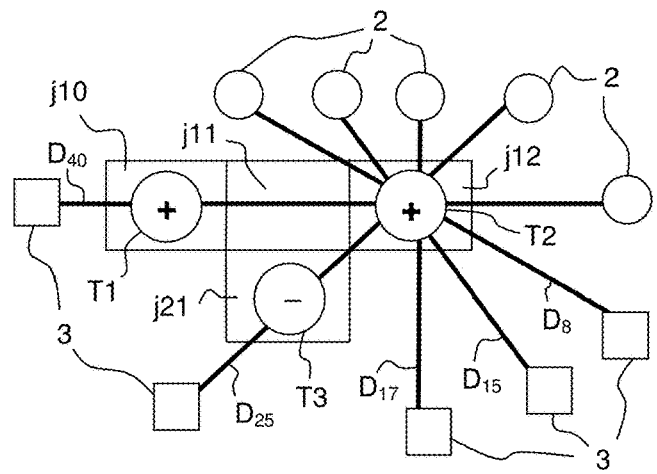

The use of the median, or an approximation thereof, will be further motivated with reference to FIG. 8, which is a simplified example of four cells j10, j11, j12, j21, a weak positive touch T1 (attenuation $0.1\alpha$), a strong positive touch T2 (attenuation $1\alpha$), a strong negative touch T3 (attenuation $-\alpha$) and five detection lines $D_8$, $D_{15}$, $D_{17}$, $D_{25}$, $D_{40}$. It is thus expected that detection lines $D_8$, $D_{15}$, $D_{17}$, $D_{25}$, $D_{40}$ present an approximate attenuation of $\alpha$, $\alpha$, $\alpha$, 0 and $1.1\alpha$, respectively. The median attenuation the intersecting detection lines for cell j12 is $\alpha$. Clearly, the extraction of a median value correctly indicates whether a touch is present in this cell. The above-mentioned back projection function would yield a cell value of 0.82α for cell j12, which is significantly incorrect.

The skilled person readily understands that the use of a robust measure of central tendency, such as a median, will generally produce a cell value that indicates if a cell contains a touch or not, also with a more realistic arrangement of detection lines such as shown in FIGS. 4A-4C. As seen in FIG. 5A, when the cell contains a touch (FIG. 4A) all (or nearly all) of the intersecting detection lines will be attenuated. Clearly, the median attenuation is a good estimate of the attenuation within the cell. As seen in FIG. 5B, when there is no touch in the cell (FIG. 4B), certain detection lines may be attenuated by positive touches and others by negative attenuation, but a proportionally large part of the intersecting detection lines will not be attenuated, and the median attenuation is likely to be a good estimate of the attenuation within the cell. The median for cells j1-j3 in FIG. 3 is indicated by a respective circle $M_{j1}$, $M_{j2}$, $M_{j3}$ in the sorted attenuation values in FIGS. 6A-6C. For cells j1, j2, j3, the median is computed to 0.173, −0.002 and 0.004, which is close to the actual values of 0.20, 0 and 0.

The inventive techniques described in sections 3.1 and 3.2 provide several advantages over known techniques for touch detection. First, the touch status may be determined based on a measure derived from the attenuation values for the intersecting detection lines. Thus, the inventive technique makes it possible to dispense with tomographic processing and thereby also eliminate the reconstruction errors that are inherent to such processing. Second, compared to tomographic techniques, the inventive techniques are not optimized for a specific arrangement of the detection lines across the touch surface. Third, the inventive techniques allow weak touches to be detected in the presence of strong touches on the touch surface. Furthermore, as will be described further below, the inventive techniques may easily be adapted to improve such detection of weak touches. Fourth, the inventive techniques may be used to validate cells within certain regions of interest (ROI) on the touch surface. For example, as described further below, the inventive technique may be combined with conventional image reconstruction (e.g. tomography) to validate certain regions in a 2D map of attenuation values produced by the image reconstruction. The ROIs may be defined based on the 2D map, e.g. for the purpose of searching for weak touches outside strong touches in the 2D map, to search for touches in regions deemed to contain reconstruction errors, or to verify if a region contains more than one touch.

Below, two exemplifying methods for touch detection in a touch-sensitive apparatus, such as the above-described FTIR system, will be described with reference to the flow charts in FIG. 9A and FIG. 9B, respectively. Since the methods only differ by the format for the attenuation values and the computation of the characteristic cell values, they will be described jointly in the following. Each method involves a sequence of steps 90-97 that are repeatedly executed, typically by the signal processor 10 (FIGS. 1-2). In the context of this description, each sequence of steps 90-97 constitutes a "frame" or "repetition".

Each frame starts by a data collection step 90, in which measurement values are obtained from the light sensors 3 in the FTIR system, typically by sampling a value from each of the aforesaid projection signals. The data collection step 90 results in one projection value for each detection line. The projection values collected in the current frame are collectively denoted by $I_t$. It may be noted that the data may, but need not, be collected for all available detection lines in the FTIR system. The data collection step 90 may also include pre-processing of the measurement values, e.g. filtering for noise reduction.

Figure 9A:
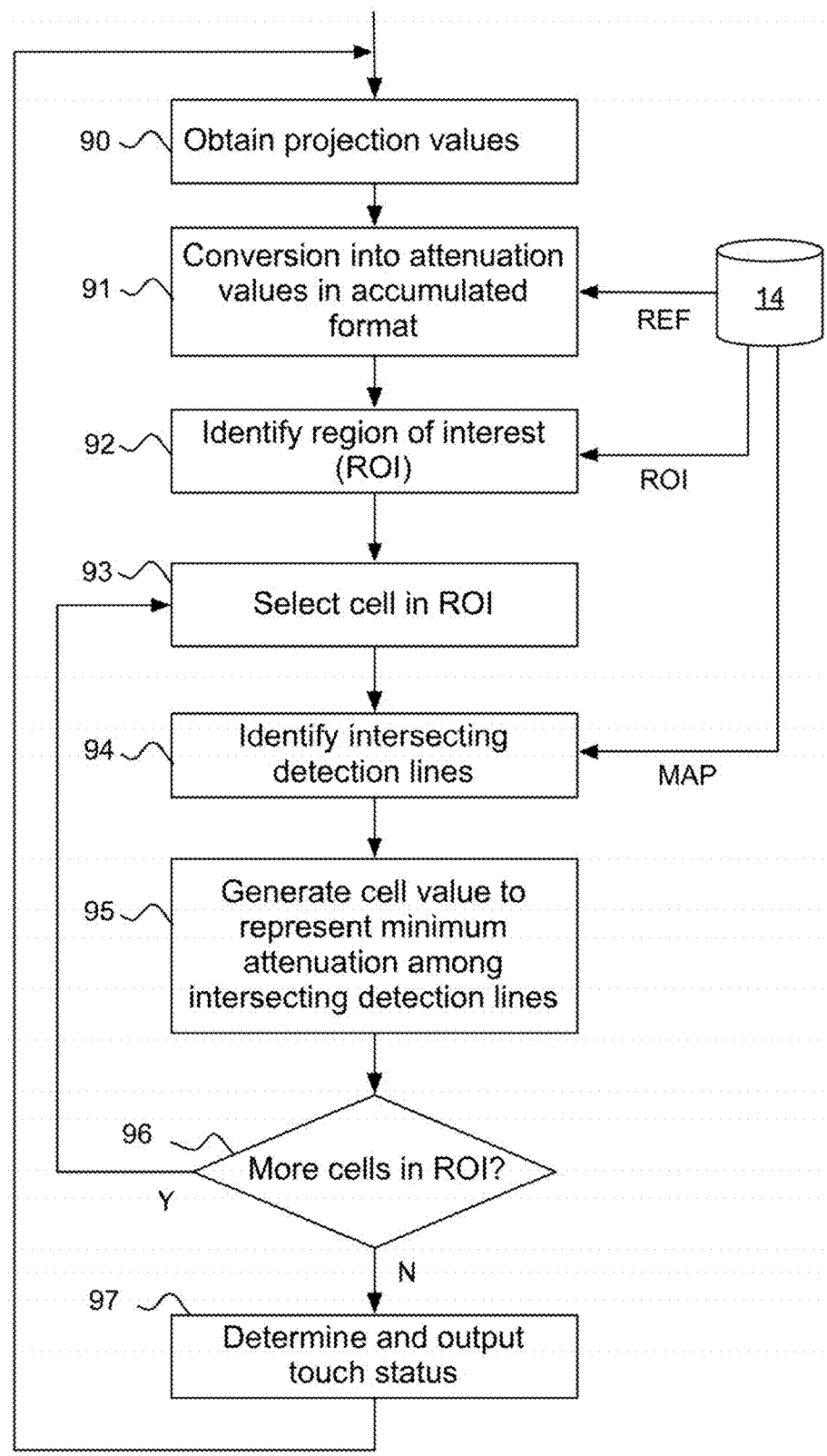
FIGS. 9A-9B are flow charts of touch detection methods according to embodiments of the invention.

In conversion step 91 of FIG. 9A, the projection values $I_t$ are processed for generation of attenuation values in the accumulated format. In conversion step 91' of FIG. 9B, the projection values $I_t$ are instead processed for generation of attenuation values in the differential format. Step 91 may involve retrieval of appropriate reference values, indicated by REF in FIGS. 9A-9B. The reference values may be retrieved, as indicated, from the memory 14, or from another process executed by the signal processor 10.

In step 92, at least one region of interest (ROI) is identified for the current frame. The ROI indicates the cells that are to be processed for touch detection. The ROI may be retrieved from the memory 14 or from another process executed by the signal processor 10. The determination of the ROI will be further exemplified below with reference to FIGS. 10 and 12. In certain implementations, step 92 may be omitted, e.g. if the ROI is the same for all frames and set to indicate the entire surface or one or more subareas.

The process then proceeds to repeat steps 93-96 for all cells in the ROI. In step 93, a cell in the ROI is selected. In step 94, the detection lines that intersect the selected cell are identified, e.g. based on a predefined cell-to-detection line mapping which is retrieved from memory 14. The mapping, indicated by MAP in FIGS. 9A-9B, may directly or indirectly associate each cell with a set of intersecting detection lines. Alternatively, the mapping may be computed on the fly. In step 95 of FIG. 9A, the characteristic cell value is generated to represent the minimum attenuation among the intersecting detection lines, e.g. as described in section 3.1. In step 95' of FIG. 9B, the characteristic cell value is instead generated as a robust measure of central tendency among the attenuation values for the intersecting detection lines, e.g. as described in section 3.2. If there are further cells in the ROI, step 96 returns to step 93. Otherwise, step 97 determines the touch status for the cells in the ROI, e.g. by comparing the characteristic cell value to a given range or threshold, which may be set globally or locally. Step 97 then outputs the touch status.

Figure 9B:
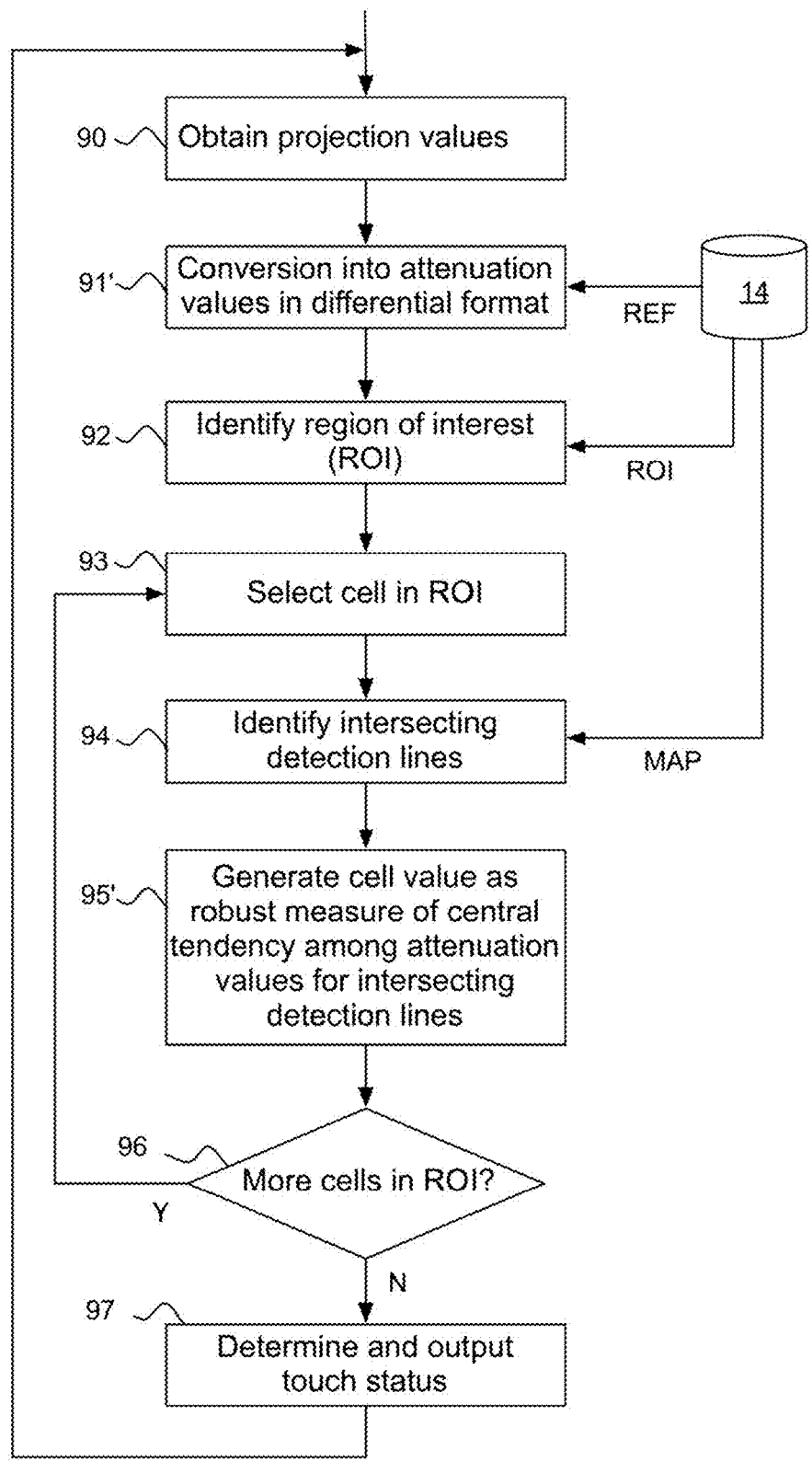

It is to be understood that FIGS. 9A-9B are merely given as examples and that one or more of the indicated steps may be modified or omitted. In one variant, the touch status is determined and output already during step 95/95'. Furthermore, one or more of the indicated steps may be executed in parallel. For example, the data collection step 90 of a subsequent frame may be initiated concurrently with any one of the steps 91/91'-97.

Although not shown in FIGS. 9A-9B, it is understood that the methods may include an initial step of defining the reconstruction grid to be used. The reconstruction grid may e.g. be defined by data retrieved from memory 14. Alternatively, the reconstruction grid may be inherently defined in steps 93-96.

4. Improvements and Extensions

In one variation, the methods in FIGS. 9A-9B are combined with an image reconstruction process that operates on at least part of the attenuation values (or corresponding values in any other format) to generate a 2D map of reconstruction values (e.g. attenuation values) for the entire touch surface or a part of touch surface. Any available algorithm for image reconstruction may be used, including tomographic methods such as Filtered Back Projection, FFT-based algorithms, ART (Algebraic Reconstruction Technique), SART (Simultaneous Algebraic Reconstruction Technique), etc. Alternatively, the image reconstruction processing may generate the 2D map by adapting one or more basis functions and/or by statistical methods such as Bayesian inversion. Examples of image reconstruction techniques designed for use in touch systems are found in WO2010/006883, WO2009/077962, WO2011/049511, WO2011/139213, WO2012/050510, and PCT/SE2012/051142 filed on Oct. 24, 2012, all of which are incorporated herein by reference. Conventional image reconstruction techniques are found in the mathematical literature, e.g. "The Mathematics of Computerized Tomography" by Natterer, and "Principles of Computerized Tomographic Imaging" by Kak and Slaney.

The inventive techniques may be combined with the use of such a 2D map in several different ways to achieve additional advantages. Below, two main embodiments that combine 2D map analysis with the touch detection techniques of FIGS. 9A-9B are presented.

In a first main embodiment, the 2D map may be processed for identification of peaks that may correspond to a touch, and the regions of these peaks may be input as a respective ROI in step 92. Thereby, the inventive touch detection may be operated to validate the cell(s) in each ROI for presence or absence of one or more touches.

Figure 10:
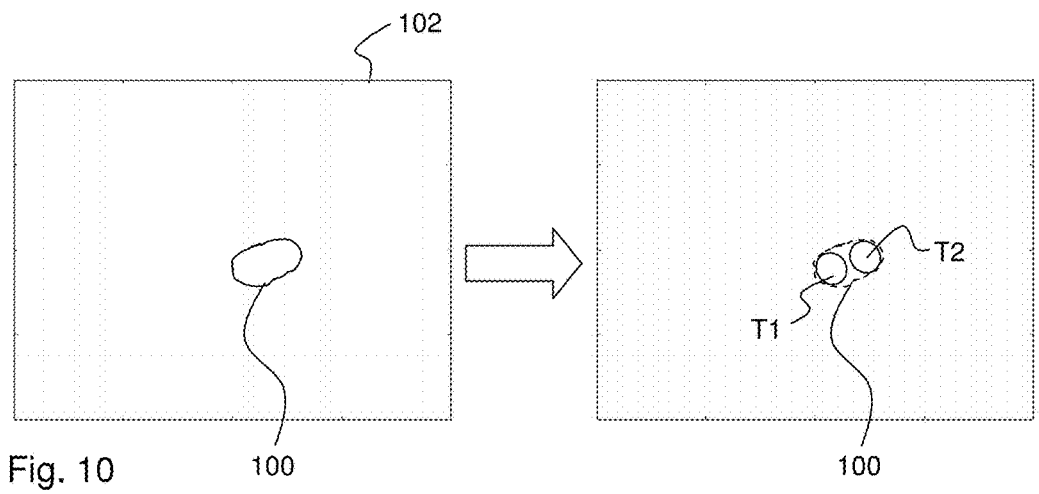
FIG. 10 illustrates use of the methods in FIG. 9 for validating a region in a 2D map obtained by conventional image reconstruction processing.

In one specific example of the first main embodiment, illustrated in FIG. 10, steps 92-96 are executed to check if an exceptionally large or irregularly shaped peak 100 in a 2D map 102 corresponds to one or more touches T1, T2. Thus, the inventive touch detection may be applied to locally improve the resolution of the 2D map 102 with respect to the location and extent of touches.

Figure 11:
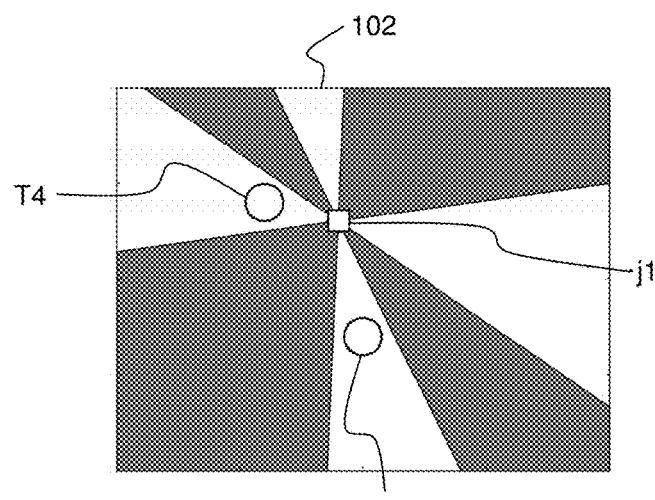
FIG. 11 illustrates a technique for selecting a subset of detection lines based on the location of other touches.

In a second main embodiment, the 2D map may be processed for identification of peaks (ROIs) that may correspond to a touch, and step 95 or 95' may be adapted to exclude the intersecting detection lines that are deemed affected by the peaks (ROIs), when computing the characteristic cell value. Thus, for each selected cell, the characteristic cell value is computed for the attenuation values of intersecting detection lines that do not pass through the peaks (ROIs). This is further illustrated in FIG. 11, which schematically illustrates a 2D map 102 containing two positive peaks T3, T4. When the reconstruction cell j1 in FIG. 11 is processed by step 95 or 95', the attenuation values belonging to the white regions may be excluded, since they are known to pass through peaks T3, T4. By excluding these attenuation values, it is possible to detect presence of a weaker touch in the reconstruction cell, even if it is not detectable in the 2D map 102. This approach of excluding attenuation values may also be used for validating (verifying) a weak touch which is detected in the 2D map 102. In a variant of the second main embodiment, step 95 or 95' may be adapted to exclude only the intersecting detection lines that are deemed affected by strong peaks, e.g. peaks that exceed a given threshold.

Figure 12:
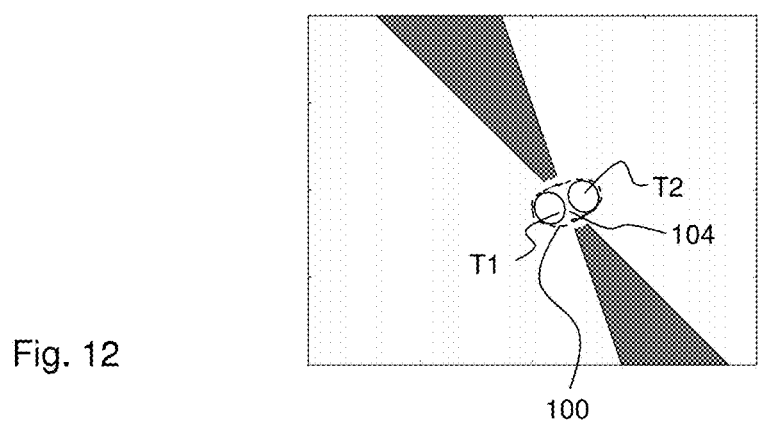
FIG. 12 illustrates use of the technique in FIG. 11 for validating a gap between touches.

The second main embodiment may be used in combination with the first main embodiment to further improve the validation of cell(s) in an ROI. Returning to FIG. 10, a first pass of steps 92-96 may be performed according to the first main embodiment to validate the cells within the peak 100. If the first pass results in cells deemed not to include a touch, e.g. the cells in the gap region 104 between the touches T1, T2, as shown in FIG. 12, these cells may be further validated in a second pass of steps 92-96 using the second main embodiment and with the ROI set to the gap region 104 (or part thereof). In the second pass, step 95 or 95' excludes the intersecting detection lines that are deemed affected by the touches T1 and T2. For example, step 95 or 95' may compute the characteristic cell value only for detection lines belonging to the dark regions in FIG. 12. This may improve the reliability of the determined touch status for each cell within the peak 100.

It is to be understood that the first and second main embodiments may be used in any combination, either in sequence or in parallel, to improve the touch detection. Further, the first and second main embodiments may also be applied to validate regions that are deemed to contain reconstruction errors, e.g. to search for weak touches that may be hidden in the reconstruction errors.

As an alternative or supplement to detecting peaks in a 2D map generated by image reconstruction processing, the location of touches in the current frame may be estimated by prediction based on their location in a number of preceding frames. In a further alternative or supplement, the location of peaks or regions of interest in the current frame may be estimated by identifying candidate areas according to WO2011/049513, which is incorporated herein by reference.

In a further combination, the inventive technique is operated to generate a touch status for all cells within an ROI, whereupon the touch status is processed for identification of one or more regions ("reconstruction region") to be reconstructed by image reconstruction processing. For example, reconstruction errors may be avoided if the reconstruction region is selected to exclude the strongest touches that are indicated by the touch status.

In another variation, step 94 in FIGS. 9A-9B may also involve a sub-step of normalizing the attenuation values for the intersecting detection lines. The normalization is thus made upstream of step 95/95' and aims at reducing differences in "interaction strength" between the different intersecting detection lines. The interaction strength is a measure of how much each detection line is affected by a uniform attenuation in the selected reconstruction cell. The interaction strength is thus given per intersecting detection line for each selected reconstruction cell, and is denoted by $P_{i,j}$ with j representing the reconstruction cell and i representing the intersecting detection lines. The interaction strength $P_{i,j}$ may be pre-computed to represent the overlap between the intersecting detection line and the reconstruction cell, e.g. given by a line integral between the detection line and the reconstruction cell. The line integral may or may not account for a width of the detection line, and possibly an intensity profile in the width direction. The interaction strength $P_{i,j}$ is also denoted "intersection value", since it represents the relative overlap between the respective detection line and the reconstruction cell.

Figure 13:
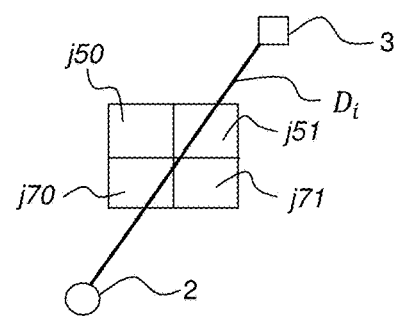
FIG. 13 illustrates a detection line that intersects a number of reconstruction cells.

As an example, FIG. 13 illustrates a detection line $D_i$ that intersects a set of cells j50, j51, j70, j71. It is realized that $P_{i,j51}$ will be larger than $P_{i,j70}$ which in turn will be larger than $P_{i,j71}$. $P_{i,j50}$ may have a small value if the detection line $D_i$ is considered to have width that extends into the cell j50.

Step 94 may thus be configured to access the memory 14 to retrieve a set of interaction strengths for the selected cell and normalize each attenuation value by its corresponding interaction strength. To avoid a division, the interaction strengths may be stored as $1/P_{i,j}$ in the memory 14.

Figures 14A, 14B, 14C:
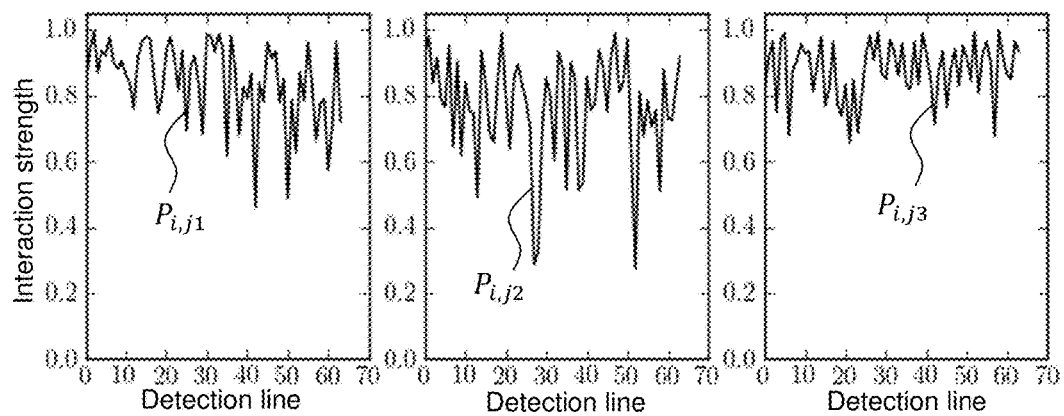
FIGS. 14A-14C are plots of computed interaction strengths for the respective set of detection lines in FIGS. 4A-4C.
Figure 15A:
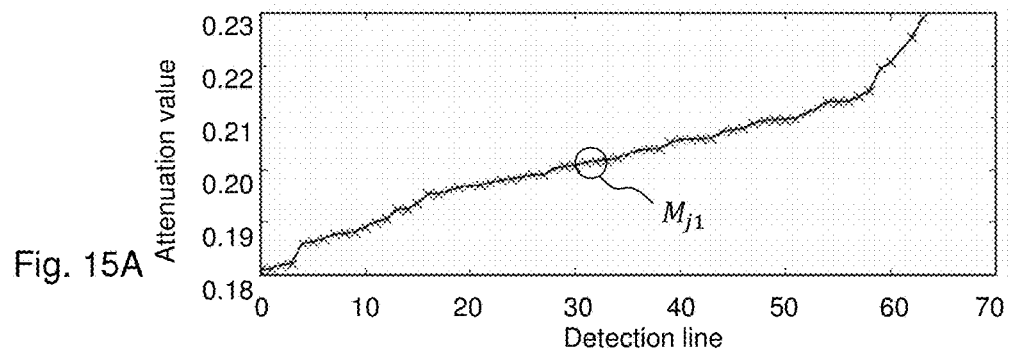
FIGS. 15A-15C are plots of the attenuation values in FIGS. 5A-5C sorted by magnitude after normalization by interaction strength.
Figure 15B:
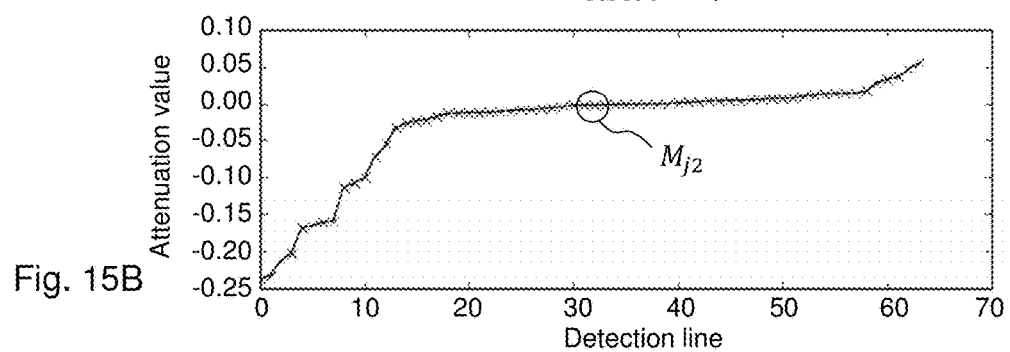
Figure 15C:
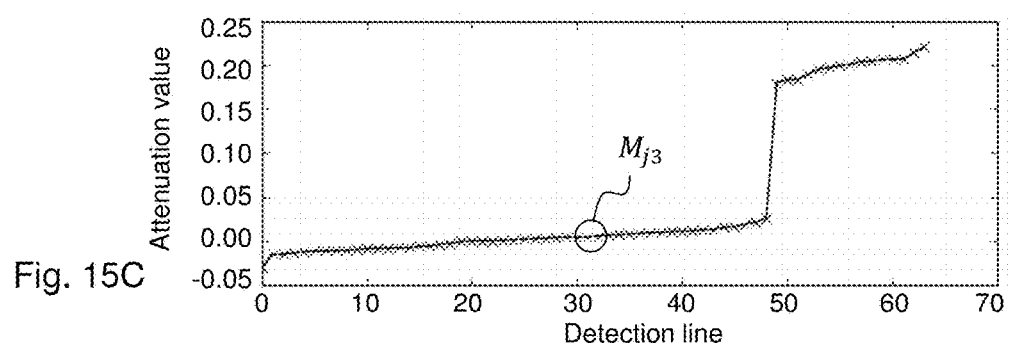
Figure 16:
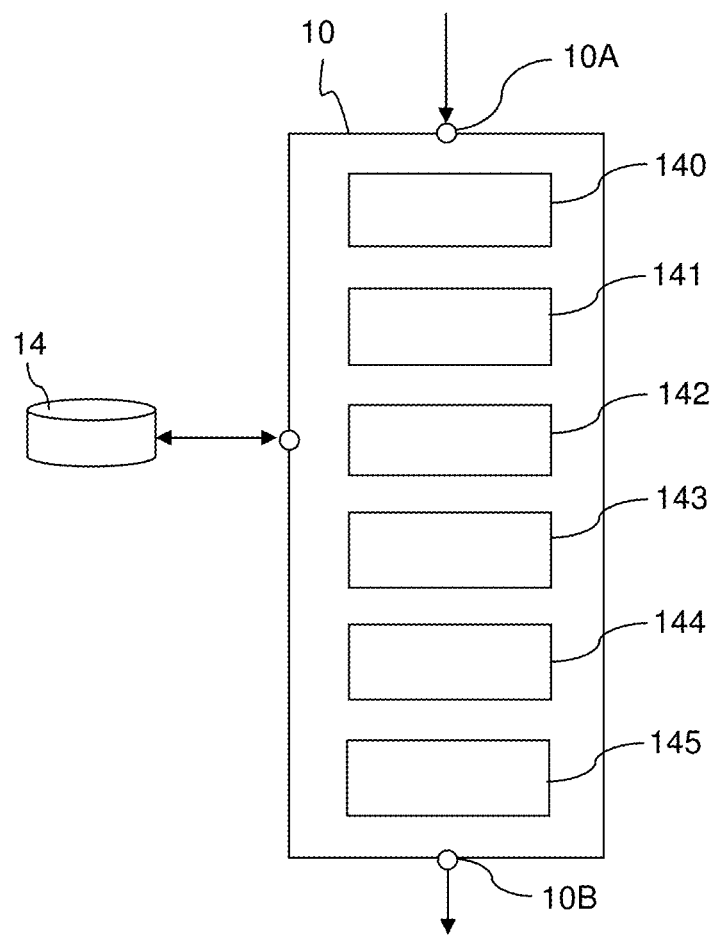
FIG. 16 is a block diagram of a device that implements the methods of FIGS. 9A and 9B.

FIGS. 14A-14C illustrate the interaction strengths of cells j1, j2 and j3, respectively, where each Figure indicates the interaction strengths that correspond to the attenuation values in FIGS. 5A-5C. FIGS. 15A-15C illustrate the corresponding normalized attenuation values sorted by magnitude. By comparing FIGS. 14A-14C with FIGS. 15A-15C, it is seen that the normalization results in a reduced variability among the attenuation values, which may improve the characteristic cell value computed in step 95/95'.

The median for cells j1-j3 in FIG. 3 is indicated by a respective circle $M_{j1}$, $M_{j2}$, $M_{j3}$ in the sorted attenuation values in FIGS. 15A-15C. For cells j1, j2, j3, the median is computed to 0.201, −0.002 and 0.005. As seen, the normalization brings the cell value for cell j1 very close to the actual value of 0.20. A back projection function, which is defined to take the interaction strength into account, may be defined as: $1/N\Sigma_i P_{j,i} \cdot \bar{\alpha}_i$, where N is the number of intersecting detection lines for cell j, and $\bar{\alpha}_i$ is the attenuation value of each intersecting detection line for cell j. For comparison, this back projection function would yield cell values of 0.145, −0.022, and 0.109 for cells j1, j2 and j3, respectively. These cell values are clearly erroneous and make touch detection difficult.

5. Hardware Implementations

The touch detection according to the various embodiments disclosed herein may be implemented by a data processing device (cf. 10 in FIGS. 1-2) which is connected to sample measurement values from the sensors 3 in the touch-sensitive apparatus. FIG. 14 shows an example of a data processing device 10 configured to implement the method in either one of FIG. 9A and FIG. 9B. The device 10 includes an input 10A for receiving the output signal. The device 10 further includes a cell definition element (or means) 140 for defining the grid of reconstruction cells on the touch surface, a data collection element (or means) 141 for obtaining the current projection values, a conversion element (or means) 142 for generating attenuation values in the accumulated format or the differential format, an ROI element (or means) 143 for identifying the region of interest, a cell value computation element (or means) 144 for repeatedly generating a characteristic cell value according to steps 94-95 in FIG. 9A or steps 94-95' in FIG. 9B, a status determination element (or means) 145 for determining the touch status of the cells based on the characteristic cell values, and an output 10B for outputting the touch status.

The device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit may serve as one element/means when executing one instruction, but serve as another element/means when executing another instruction. In addition, one element/means may be implemented by one instruction in some cases, but by a plurality of instructions in some other cases. Naturally, it is conceivable that one or more elements (means) are implemented entirely by analog hardware components.

The software controlled device 10 may include one or more processing units (cf. 14 in FIG. 1), e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software, reference values (REF), region of interest data (ROI), mapping of cells to detection lines (MAP), and any other data needed during execution, may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc, as well as one or more data acquisition devices, such as an A/D converter. The special-purpose software may be provided to the device 10 on any suitable computer-readable medium, including a record medium, and a read-only memory.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

For example, the attenuation values need not strictly represent attenuation for the individual detection lines, but could be "interaction values" that represent interaction in a broad sense. With respect to the specific formats of the attenuation values $\bar{\alpha}_i$ presented in the foregoing description, modifications may be made, e.g., to sign, scaling or offset. In other variants, the interaction values may be generated as a transmission (e.g. given by the projection value normalized by the reference value), an energy difference (e.g. given by the difference between the projection value and the reference value), or a logarithm of the energy difference. It may even be possible to use the projection values as interaction values. It is also conceivable to generate the interaction values by subjecting the projection signals to digital filtering. For example, interaction values representing short-term changes (corresponding to interaction changes during the above-mentioned time interval Δt) may be generated by applying a high-pass filter on the individual projection signals.

The skilled person can readily adapt the teachings herein to such alternative interaction values. For example, the characteristic cell value may be computed to represent a maximum instead of a minimum if the attenuation values in the accumulated format are computed to represent touches by negative values. In fact, the use of minimum/maximum is an implementation of a general detection principle, according to which the characteristic cell value is computed to represent a subset of the interaction values that are closest to a target value, which is set to indicate absence of interaction. The subset of interaction values may be identified by matching the interaction values of the intersecting detection lines to the target value or a range that includes the target value. In the above examples, the target value is set to zero and the identification of the subset of interaction values may be implemented as a simple estimation of minimum/maximum. In alternative implementations, the target value may be set to deviate from zero, e.g. when absence of interaction is represented by a non-zero value. The skilled person realizes that this general detection principle may not only be applied to interaction values in the accumulated format, but also to interaction values in the differential format, since it will identify all cells that are unaffected by touches.

The skilled person also understands that the use of a robust measure of central tendency is generally applicable to identify touches that are represented by interaction values that are larger and smaller than a target value that represents absence of interaction. Thus, the target value may be either negative, positive or zero.

It is also to be noted that the inventive detection may not only be used to detect touches, which correspond to actively controlled objects on the touch surface, but also to detect the location of contamination or changes in contamination on the touch surface.

The invention claimed is:

1. A method of detecting objects on a panel, wherein signals are transmitted across the panel such that the objects are allowed to interact with the signals by contact with a touch surface of the panel, said method comprising:
   obtaining an output signal from a signal detection arrangement;
   processing the output signal to obtain an interaction value for each transmission path;
   generating a two-dimensional distribution of values representative of the interaction on the touch surface by operating an image reconstruction algorithm on the interaction values for at least a portion of the transmission paths;
   identifying one or more touch candidates from the two-dimensional distribution of values, the one or more touch candidates each having a location on the touch surface;
   selecting reconstruction cells, from a plurality of reconstruction cells, corresponding to each location of the identified one or more touch candidates on the touch surface, wherein the plurality of reconstruction cells are defined with respect to the touch surface, each of the plurality of reconstruction cells having a given location on the touch surface and being intersected by a respective set of transmission paths for the signals across the touch surface;
   generating a cell value for the selected reconstruction cells based on the interaction values for the set of transmission paths that intersect the selected reconstruction cells;
   processing each cell value of the selected reconstruction cells to validate the one or more touch candidates; and
   detecting objects on the panel based on the validation of the one or more touch candidates;
   wherein the cell value is generated as a function of a subset of the interaction values.

2. The method of claim 1, wherein interaction between one of the objects and the signals on the transmission paths is represented by interaction values of a given sign.

3. The method of claim 1, wherein the interaction values for the transmission paths are generated to represent interactions between one of the objects and the signals on the transmission paths by one of exclusively non-negative values and exclusively non-positive values.

4. The method of claim 1, wherein the generating a cell value comprises:
   extracting one of a single interaction value, a percentile value, and an average of interaction values within a percentile among the interaction values for the set of transmission paths that intersect the selected reconstruction cell.

5. The method of claim 1, further comprising:
   validating a touch candidate by comparing the corresponding cell value to a threshold, the validation indicating presence or absence of one of the objects in the selected reconstruction cell.

6. The method of claim 1, further comprising:
   measuring, by the signal detection arrangement, energy of light that has propagated along the transmission paths inside the panel by internal reflections between a front surface and an opposing surface of the panel, wherein the front surface defines the touch surface and allows the light to be attenuated by interaction with the objects.

7. A method of detecting objects on a panel, wherein signals are transmitted across the panel such that the objects are allowed to interact with the signals by contact with a touch surface of the panel, said method comprising:
   obtaining an output signal from a signal detection arrangement;
   processing the output signal to obtain an interaction value for each transmission path such that the interaction between the objects and the signals on the transmission paths is represented by interaction values that are larger and smaller than a target value that represents absence of interaction;
   generating a two-dimensional distribution of values representative of the interaction on the touch surface by operating an image reconstruction algorithm on the interaction values for at least a portion of the transmission paths;
   identifying one or more touch candidates from the two-dimensional distribution of values, the one or more touch candidates each having a location on the touch surface;
   selecting reconstruction cells, from a plurality of reconstruction cells, corresponding to each location of the identified one or more touch candidates on the touch surface, wherein the plurality of reconstruction cells are defined with respect to the touch surface, each of the plurality of reconstruction cells having a given location on the touch surface and being intersected by a respective set of transmission paths for the signals across the touch surface;
   generating a cell value for the selected reconstruction cells based on the interaction values for the set of transmission paths that intersect the selected reconstruction cells;
   processing each cell value of the selected reconstruction cells to validate the one or more touch candidates; and
   detecting objects on the panel based on the validation of the one or more touch candidates;
   wherein the cell value is generated as a robust measure of central tendency among at least part of the interaction values for the set of transmission paths.

8. The method of claim 7, wherein the robust measure of central tendency is computed to represent a median value among said at least part of the interaction values.

9. The method of claim 7, wherein the generating a cell value is performed for a plurality of selected reconstruction cells within a region of interest on the touch surface.

10. The method of claim 9, further comprising:
    processing the two-dimensional distribution to identify said region of interest.

11. The method of claim 10, wherein said region of interest is identified in the two-dimensional distribution to contain at least one candidate touch.

12. The method of claim 10, wherein the region of interest is a coherent region of values that indicate presence of an object.

13. The method of claim 7, wherein an interaction value, among the interaction values, is generated to represent a change in interaction with respect to a reference value for a corresponding transmission path.

14. The method of claim 7, further comprising:
measuring, by the signal detection arrangement, energy of light that has propagated along the transmission paths inside the panel by internal reflections between a front surface and an opposing surface of the panel; wherein the front surface defines the touch surface and allows the light to be attenuated by interaction with the objects.

15. A device for detecting objects on a panel, the objects allowed to interact, by contact with a touch surface of the panel, with signals transmitted across the panel, said device comprising:
at least one processor configured to execute computer-readable instructions to
obtain an output signal from a signal detection arrangement,
process the output signal to obtain an interaction value for each transmission path,
generate a two-dimensional distribution of values representative of the interaction on the touch surface by operating an image reconstruction algorithm on the interaction values for at least a portion of the transmission paths;
identify one or more touch candidates from the two-dimensional distribution of values, the one or more touch candidates each having a location on the touch surface;
select reconstruction cells, from a plurality of reconstruction cells, corresponding to each location of the identified one or more touch candidates on the touch surface, wherein the plurality of reconstruction cells are defined with respect to the touch surface, each of the plurality of reconstruction cells having a given location on the touch surface and being intersected by a respective set of transmission paths for the signals across the touch surface;
generate a cell value for the selected reconstruction cells based on the interaction values for the set of transmission paths that intersect the selected reconstruction cells, the cell value generated as a function of a subset of the interaction values and without tomographic reconstruction,
process each cell value of the selected reconstruction cells to validate the one or more touch candidates; and
detect objects on the panel based on the validation of the one or more touch candidates.

16. A touch-sensitive apparatus including a device according to claim 15, the touch-sensitive apparatus further comprising:
the panel, wherein the panel is configured to conduct the signals from a plurality of peripheral incoupling points to a plurality of peripheral outcoupling points, thereby defining transmission paths that extend across the touch surface on the panel between pairs of incoupling and outcoupling points;
at least one emitter configured to generate the signals at the incoupling points; and
the signal detection arrangement, wherein the signal detection arrangement is configured to generate an output signal based on detected signals at the outcoupling points.

* * * * *